United States Patent
Imamura

(10) Patent No.: US 8,717,490 B2
(45) Date of Patent: May 6, 2014

(54) IMAGING APPARATUS, FOCUSING METHOD, AND COMPUTER-READABLE RECORDING MEDIUM RECORDING PROGRAM

(75) Inventor: Keiichi Imamura, Hamura (JP)

(73) Assignee: Casio Computer Co., Ltd, Tokyo (JP)

( * ) Notice: Subject to any disclaimer, the term of this patent is extended or adjusted under 35 U.S.C. 154(b) by 473 days.

(21) Appl. No.: 12/784,855

(22) Filed: May 21, 2010

(65) Prior Publication Data

US 2010/0321515 A1    Dec. 23, 2010

(30) Foreign Application Priority Data

Jun. 19, 2009  (JP) ................. 2009-146272
Jun. 19, 2009  (JP) ................. 2009-146281

(51) Int. Cl.
*H04N 5/232* (2006.01)
(52) U.S. Cl.
USPC ....................................... 348/345
(58) Field of Classification Search
USPC ................. 348/222.1, 345–352
See application file for complete search history.

(56) References Cited

U.S. PATENT DOCUMENTS

| | | | | |
|---|---|---|---|---|
| 7,944,499 | B2 * | 5/2011 | Ito ................. | 348/345 |
| 8,570,427 | B2 * | 10/2013 | Ohnishi et al. ............ | 348/345 |
| 2002/0012063 | A1 * | 1/2002 | Kobayashi ................ | 348/345 |
| 2004/0125229 | A1 * | 7/2004 | Aoyama et al. ............ | 348/345 |
| 2007/0236597 | A1 * | 10/2007 | Kurokawa et al. ........... | 348/345 |
| 2007/0286589 | A1 * | 12/2007 | Ishiwata et al. ............. | 396/125 |
| 2008/0008361 | A1 * | 1/2008 | Nozaki et al. .............. | 382/118 |
| 2008/0012949 | A1 * | 1/2008 | Kobayashi ............. | 348/208.12 |
| 2008/0094478 | A1 * | 4/2008 | Sato .................... | 348/208.12 |
| 2008/0136958 | A1 * | 6/2008 | Nakahara ................. | 348/345 |
| 2008/0193115 | A1 * | 8/2008 | Uenishi ................... | 396/123 |
| 2009/0213263 | A1 * | 8/2009 | Watanabe ................. | 348/349 |
| 2009/0284645 | A1 * | 11/2009 | Nozaki et al. ............. | 348/349 |
| 2013/0135442 | A1 * | 5/2013 | Kwon ................... | 348/47 |

FOREIGN PATENT DOCUMENTS

CN    1731268 A    2/2006
CN    101071252 A   11/2007

(Continued)

OTHER PUBLICATIONS

Japanese Office Action for Application No. 2009-146281 mailed on May 17, 2011.

(Continued)

*Primary Examiner* — Aung S Moe
*Assistant Examiner* — Amy Hsu
(74) *Attorney, Agent, or Firm* — Amin, Turocy & Watson, LLP

(57) ABSTRACT

An imaging apparatus, comprises: an imaging section; a detecting section to detect an image area of a subject from an image imaged by the imaging section; an area setting section to set one or a plurality of evaluation areas to calculate focusing evaluation values in the image area of the subject detected by the detecting section; a calculating section to calculate the focusing evaluation values with regard to the one or the plurality of evaluation areas set by the area setting section; and a focusing section to be in focus based on a calculated result by the calculating section.

15 Claims, 10 Drawing Sheets

(56) References Cited

FOREIGN PATENT DOCUMENTS

| | | |
|---|---|---|
| JP | 63-070813 | 3/1988 |
| JP | 2003-167185 | 6/2003 |
| JP | 2006-227080 | 8/2006 |
| JP | 2006-227080 A | 8/2006 |
| JP | 2007-114411 A | 5/2007 |
| JP | 2007-178542 | 7/2007 |
| JP | 2007-286255 | 11/2007 |
| JP | 2008-072696 | 3/2008 |
| JP | 2008-164839 | 7/2008 |
| JP | 2008-175995 A | 7/2008 |
| JP | 2009-025381 | 2/2009 |

OTHER PUBLICATIONS

Japanese Office Action for Application No. 2009-146272 mailed on May 24, 2011.
Chinese Office Action for Chinese Application No. 201010206829.9 mailed on May 2, 2012.
Japanese Office Action for Japanese Application No. 2009-146272 mailed on Apr. 3, 2012.
Translation of Office Action of Notification of Reasons for Refusal for Japanese Patent Application No. 2011-160708 Dated Apr. 16, 2013, 9 pgs.
Office Action of Notification of Reasons for Refusal for Japanese Patent Application No. 2011-160708 Dated Oct. 1, 2013, 9 pgs.

* cited by examiner

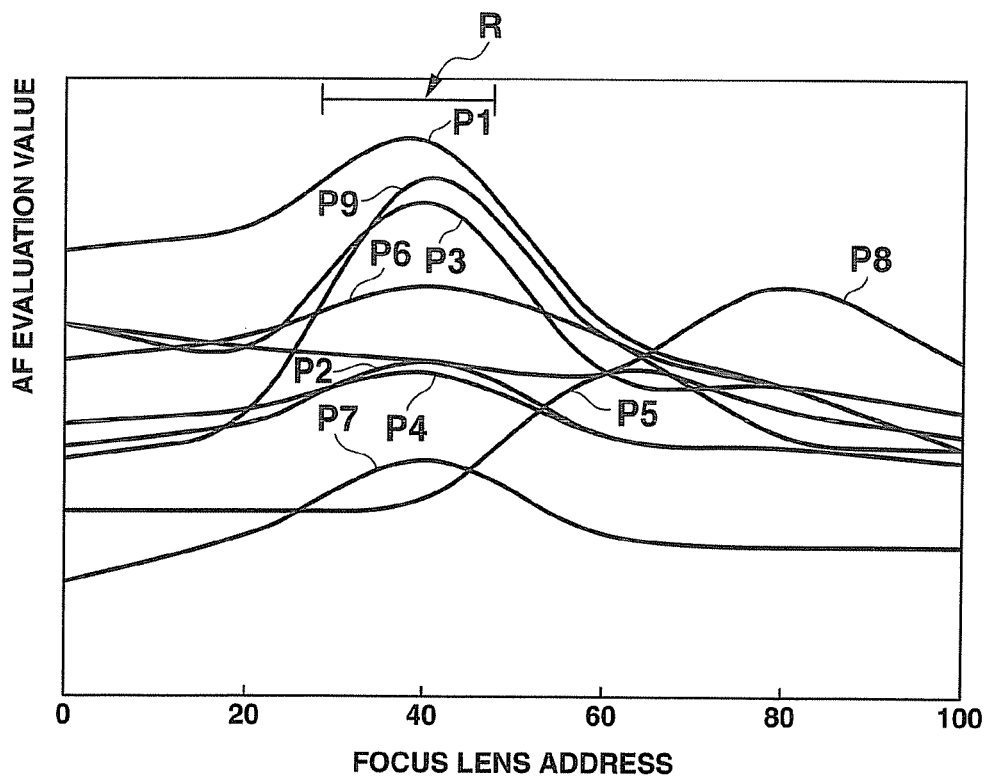

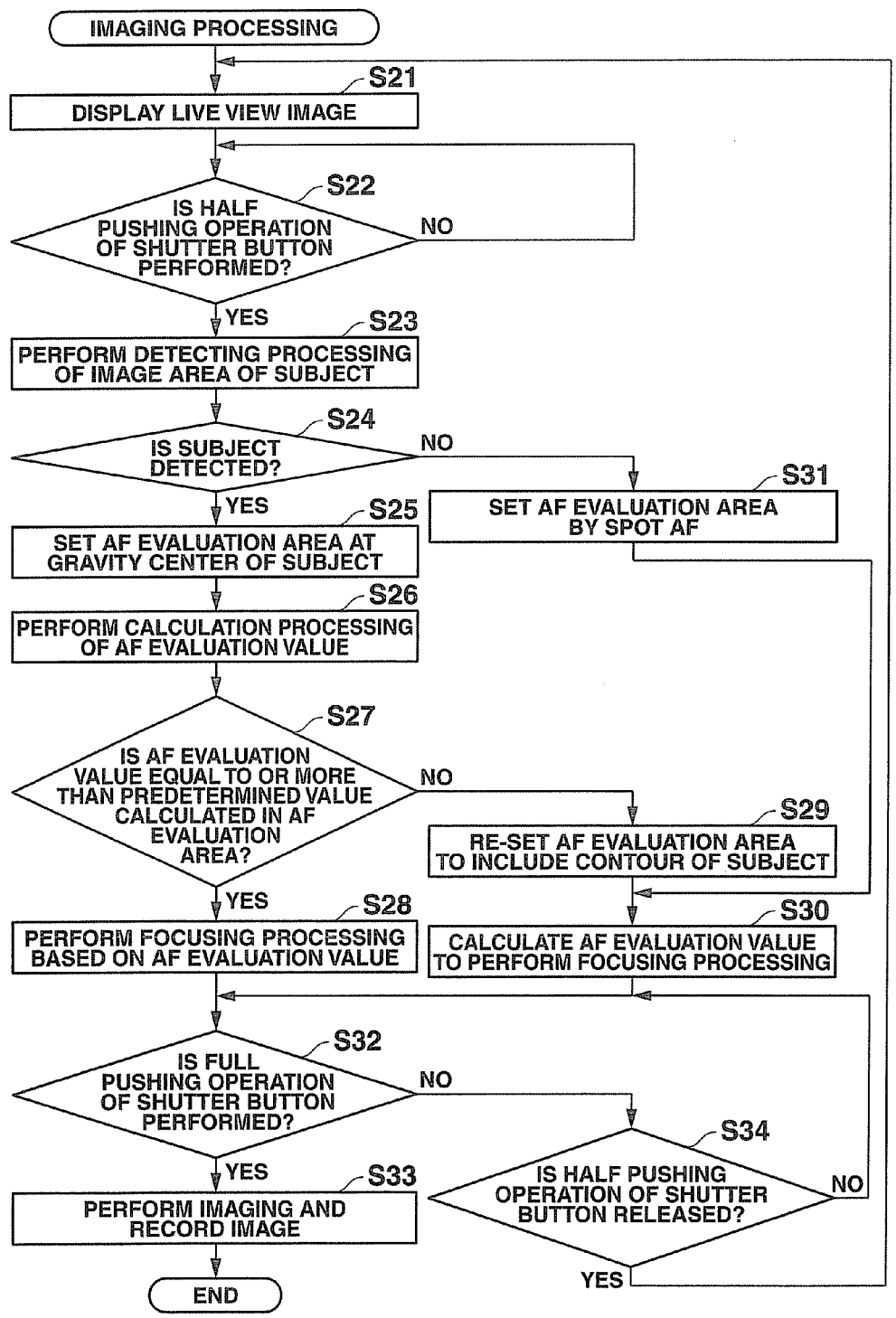

F21, P21  S  G

L

A

F22, P22  S  G

F22, P22  G

S

IMAGING APPARATUS, FOCUSING METHOD, AND COMPUTER-READABLE RECORDING MEDIUM RECORDING PROGRAM

CROSS-REFERENCE TO RELATED APPLICATIONS

This application is based on and claims the benefit of priorities from the prior Japanese Patent Application No. 2009-146272 filed on Jun. 19, 2009, and Japanese Patent Application No. 2009-146281 filed on Jun. 19, 2009, and including specification, claims, drawings and summary, the entire contents of which are incorporated herein by reference.

BACKGROUND OF THE INVENTION

1. Field of the Invention

The present invention relates to an imaging apparatus performing autofocus (automatic focus) processing using an image recognition function, a focusing method, and a computer-readable recording medium recording a program.

2. Description of the Related Art

It has become possible to perform photographing an image of a person's face in focus by adopting an image recognition technique, such as a face recognition technique, in autofocus (AF) processing of a digital camera in recent years.

Moreover, the technique of applying the aforesaid technique to remember the position and size of a detected face area in an imaged image and set them for detecting the face area at the set position and size at the time of detecting the phase area in the next photographing through-the-lens image has also been known.

SUMMARY OF THE INVENTION

Because the technique mentioned above however searches for a face area to be focused by giving a priority to a position and a size in the imaged image when the position and size of the face area to be detected in the imaged image have once been set, the technique has the problem of composition to be fixed at the time of photographing still images.

It is accordingly an object of the present invention to enabling setting an AF evaluation area suitable for a subject.

To achieve at least one of the aforementioned objects or other objects, in accordance with a first aspect of the present invention, an imaging apparatus, comprises:

an imaging section;
a detecting section to detect an image area of a subject from an image imaged by the imaging section;
an area setting section to set one or a plurality of evaluation areas to calculate focusing evaluation values in the image area of the subject detected by the detecting section;
a calculating section to calculate the focusing evaluation values with regard to the one or the plurality of evaluation areas set by the area setting section; and
a focusing section to be in focus based on a calculated result by the calculating section.

In accordance with a second aspect of the present invention, a focusing method, comprising the steps of:

detecting an image area of a subject from an image imaged by an imaging section of an imaging apparatus;
setting one or a plurality of evaluation areas to calculate focusing evaluation values in the image area of the subject detected at the step of detecting;
calculating the focusing evaluation values with regard to the one or the plurality of evaluation areas set at the step of setting; and
performing focusing based on a calculated result at the step of calculating.

In accordance with a third aspect of the present invention, a computer-readable recording medium recording a program for enabling a computer equipped in an imaging apparatus to realize the functions as:

a detecting section to detect an image area of a subject from an imaged image;
an area setting section to set one or a plurality of evaluation areas to calculate focusing evaluation values in the image area of the subject detected by the detecting section;
a calculating section to calculate the focusing evaluation values with regard to the one or the plurality of evaluation areas set by the area setting section; and
a focusing controlling section to be in focus based on a calculated result by the calculating section.

BRIEF DESCRIPTION OF THE DRAWINGS

These objects and other objects and advantages of the present invention will become more apparent upon reading of the following detailed description and the accompanying drawings in which:

FIG. 4A shows an example of a typical diagram showing AF evaluation areas where AF evaluation values relating to the imaging processing in FIG. 2 are calculated;

FIG. 4B shows an example of a typical diagram showing a relationship between AF evaluation values relating to the imaging process in FIG. 2 and focus lens address;

FIG. 9 is a flow chart showing an example of the operation pertaining to the imaging processing by the imaging apparatus in FIG. 8;

DETAILED DESCRIPTION OF THE PREFERRED EMBODIMENTS

In the following, the concrete embodiments of the present invention will be described with reference to the accompanying drawings. The scope of the invention is however not limited to the shown examples.

Figure 1:
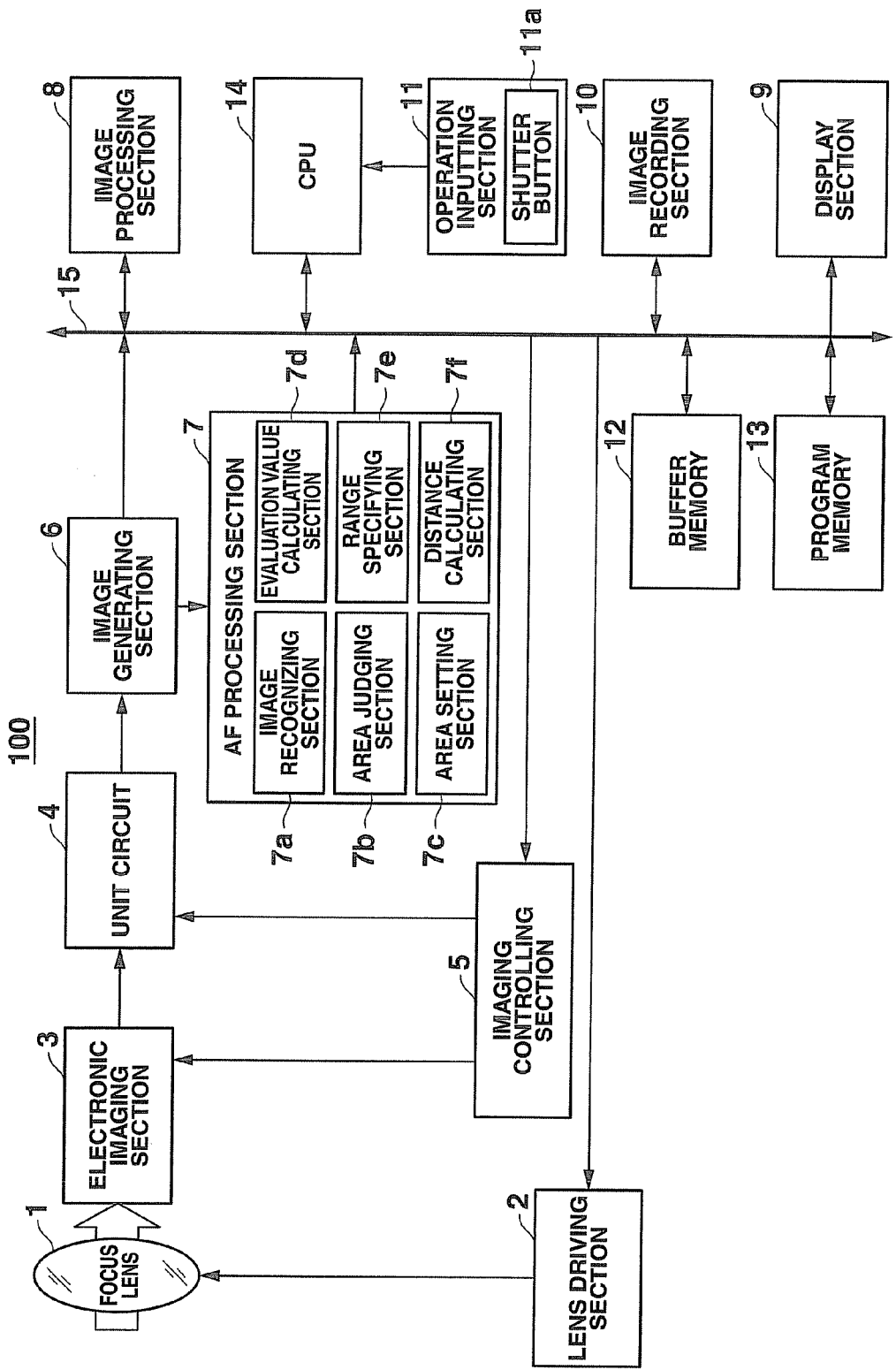
FIG. 1 is a block diagram showing the schematic configuration of an imaging apparatus of a first embodiment to which the present invention is applied.

FIG. 1 is a block diagram showing the schematic configuration of an imaging apparatus 100 of a first embodiment to which the present invention is applied.

First Embodiment

The imaging apparatus 100 of the first embodiment, as shown in FIG. 1, includes a focus lens 1, a lens driving section 2, an electronic imaging section 3, a unit circuit 4, an imaging controlling section 5, an image generating section 6, an AF processing section 7, an image processing section 8, a display section 9, an image recording section 10, an operation inputting section 11, a buffer memory 12, a program memory 13, a CPU 14, and the like.

Moreover, the lens driving section 2, the imaging controlling section 5, the image generating section 6, the AF processing section 7, the image processing section 8, the display section 9, the image recording section 10, the buffer memory 12, the program memory 13, and the CPU 14 are connected to one another through a bus line 15.

The lens driving section 2 drives the focus lens 1 into an optical axis direction. To put it concretely, the lens driving section 2 includes a driving source, such as a focus motor, a driver to drive the driving source in accordance with a control signal from the CPU 14, and the like (the illustration of all of them are omitted).

The electronic imaging section 3 is arranged on the optical axis of the focus lens 1. Moreover, the electronic imaging section 3 is composed of, for example, an image sensor, such as a charge coupled device (CCD) and a complementary metal-oxide semiconductor (CMOS) and converts the optical images that have passed through various lenses, such as the focus lens 1, into the signals of two-dimensional images.

The unit circuit 4 receives the input of an analog image signal according to the optical image of a subject, which image signal has been output from the electronic imaging section 3. Moreover, the unit circuit 4 is composed of a CDS to hold an input image signal, a gain adjusting amplifier (AGC) to amplify the image signal, an analog-to-digital (A/D) converter (ADC) to convert the amplified image signal into a digital image signal, and the like.

Then, the unit circuit 4 transmits the digital image signal to the image generating section 6.

The imaging controlling section 5 performs the control of driving the electronic imaging section 3 and the unit circuit 4 at a timing in accordance with the frame rate set by the CPU 14. To put it concretely, the imaging controlling section 5 includes a timing generator (TG), a driver to drive the electronic imaging section 3, and the like (the illustration of all of them are omitted), and controls the operation timings of the driver and the unit circuit through the TG. That is, when the CPU 14 sets a shutter speed in accordance with a program diagram read out of the program memory 13, the TG of the imaging controlling section 5 outputs the charge accumulating time corresponding to the shutter speed to the driver as a shutter pulse, and makes the electronic imaging section 3 operate in accordance with a drive pulse signal from the driver to control the charge accumulating time (exposure time).

The image generating section 6 performs the processing such as γ correction processing and white balance processing to the image data transmitted from the unit circuit 4, and generates a luminance/color difference signal (YUV data). Then, the image generating section 6 outputs the image data of the generated luminance/color difference signal to the AF processing section 7 and the image processing section 8.

Figure 5A:
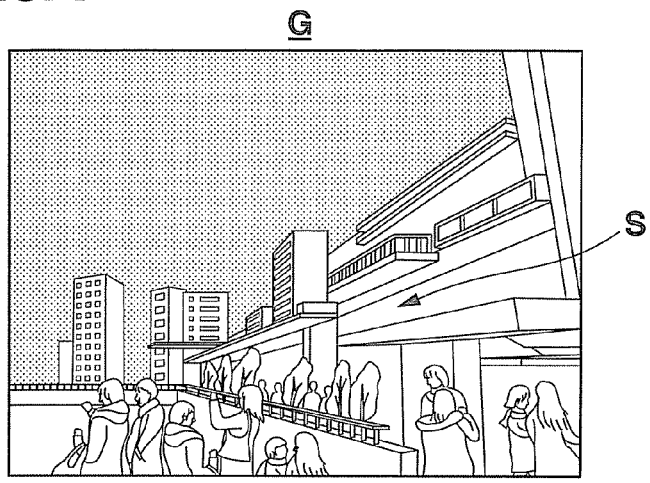
FIG. 5A is an example of a diagram of an image relating to the imaging processing in FIG. 2.

The AF processing section 7 includes an image recognizing section 7a to perform the image recognition of imaged image G (see FIG. 5A and the like) on the basis of the image data of the imaged image G.

Figure 5B:
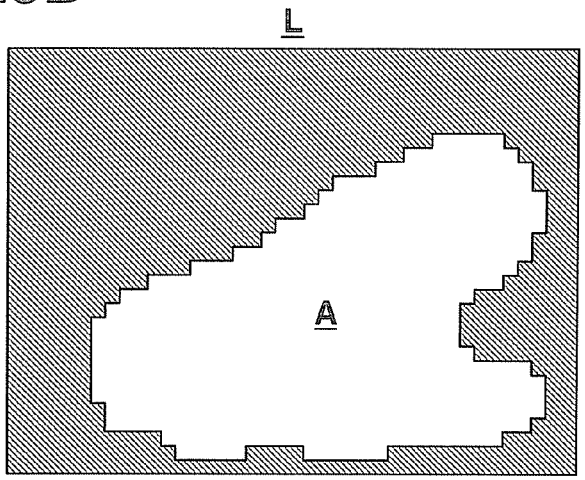
FIG. 5B is an example of a diagram of a result of the analysis of the image in FIG. 5A.

The image recognizing section 7a obtains image data of low resolution by performing reducing processing of predetermined magnification ratios in both of the horizontal direction (lateral direction) and the vertical direction (longitudinal direction) to image data, for example, every transmission of the image data from the image generating section 6, and furthermore the image recognizing section 7a sequentially generates analysis result image data (for example, lateral direction×longitudinal direction: 40×30 pixels. See FIG. 5B) L showing the results of the analysis of the low resolution image data by using a predetermined image recognition technique. Then, the image recognizing section 7a extracts an image area A by specifying a subject S to be a focusing object by using a predetermined image recognition technique to the analysis result image data L.

The image recognition processing may be performed by, for example, extracting the contour of the pixel set of the subject S by using the various kinds of information of an image, such as the color thereof, the brightness thereof, the contrast thereof, the high frequency component information thereof, and the like, or may be performed by extracting the contour by performing the comparison judgment of the featured information of a subject S with those pieces of featured information of previously specified kinds of subjects S.

The image recognizing section 7a thus detects the image area A of the subject S from the imaged image G.

Figure 10A:
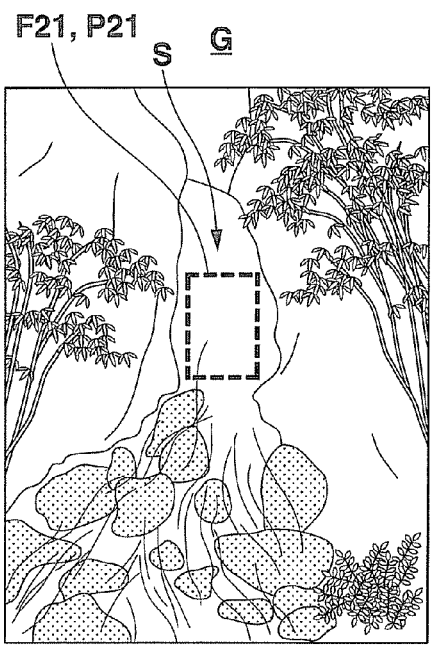
FIG. 10A is an example of a diagram of an image relating to the imaging processing in FIG. 8.
Figure 10B:
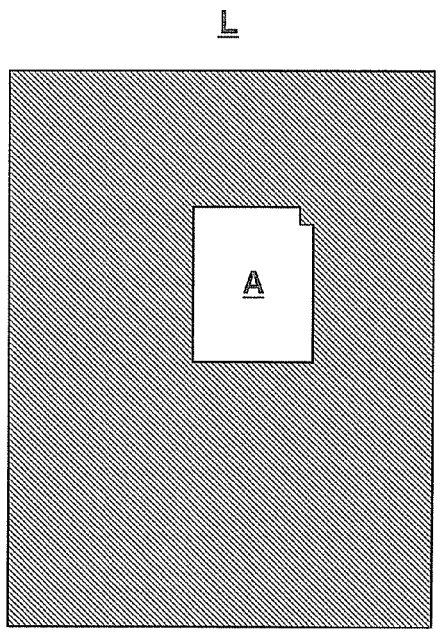
FIG. 10B is an example of a diagram of a result of the analysis of the image in FIG. 10A.

Incidentally, analysis result image data is shown by being binarized in FIGS. 5B, 6B, 7B, and 10B, which FIG. 10B will be described later. The image areas A expressed to be void areas with no included dots correspond to the subjects S, and the image areas A expressed to be black areas with included dots correspond to the parts other than the subjects S.

Moreover, each of the subjects S is not necessarily to be independent as one subject, but may be in the state in which a plurality of subjects overlaps with one another in a front-back direction, or may be in the state in which a plurality of subjects is separated from one another to be isolated in a right-left direction or in an above-below direction.

Moreover, the AF processing section 7 includes an area judging section 7b to perform judgment processing on the basis of the size of an image area A of a subject S.

The area judging section 7b judges whether the size of the image area A of the subject S detected by the image recognizing section 7a is larger than the maximum size of each AF evaluation area P set in advance or not. The maximum size of the AF evaluation areas P is set, for example, to the analysis result image data L, which has the low resolution (for example, lateral direction×longitudinal direction: 40×30 pixels) image data, to be 12 pixels in the maximum horizontal width and 8 pixels in the maximum vertical width.

The area judging section 7b thus judges whether the size of the image area A of the subject S is larger than the maximum size settable as an AF evaluation area P or not.

Moreover, the AF processing section 7 includes an area setting section 7c to set the AF evaluation areas P, which are evaluation areas of the focused state of the focus lens 1.

The area setting section 7c pertains to the evaluation of the focused state of the focus lens 1 in an imaged image G, and sets the AF evaluation areas P (see FIG. 5A and the like), in each of which an AF evaluation value is calculated by an evaluation value calculating section 7d. That is, the area detecting section changes the number of set AF evaluation areas P according to the size of an image area A of a subject S (for example, the maximum rectangular frame enclosing the image area A of the subject S, or the like) to set the AF evaluation areas P. To put it concretely, if the area judging section 7b judges that the size of an image area A of a subject S is larger than the maximum size of the AF evaluation areas P, the area setting section 7c sets a plurality of AF evaluation areas P (for example, nine; see FIG. 4A). At this time, the area setting section 7c sets each of the plurality of AF evaluation areas P at the positions where the AF evaluation areas P overlap with the image area A of the subject S or at the positions where the AF evaluation areas P intersect with the contour part of the image A of the subject S so that the AF evaluation areas P may contain the image area A of the subject S. On the other hand, if the area judging section 7b judges that the size of an image area A of a subject S is equal to or less than the maximum size of the AF evaluation areas P, the area setting section 7c sets one of the AF evaluation areas P.

Moreover, if the image recognizing section 7a does not detect any subjects S, the area setting section 7c changes the distance measuring method at that time to a "spot AF" method to set an AF evaluation area at almost the center of the field angle in that case.

The area setting section 7c thus sets one or a plurality of AF evaluation areas P, in which AF evaluation values should be calculated, as the evaluation areas of the focused state of an imaging section in an image area A of a subject S detected by the image recognizing section 7a.

Incidentally, the area setting section 7c may set a plurality of AF evaluation areas P when the ratio of the size of an image area A of a subject S to that of the imaged image G is equal to or more than a predetermined ratio (for example, 50%). That is, the area judging section 7b judges whether the ratio of the size of an image area A of a subject S to that of an imaged image G is equal to or more than a predetermined ratio (for example, 50%) or not. Then, if the area judging section 7b judges that the ratio of the size of the image area A of the subject S to that of the imaged image G is equal to or more than the predetermined ratio (for example, 50%) as a result of the judgment, then the area setting section 7c sets a plurality of AF evaluation areas P.

Moreover, the AF processing section 7 includes the evaluation value calculating section 7d to calculate an AF evaluation value pertaining to the evaluation of a focused state of the focus lens 1.

The evaluation value calculating section 7d calculates AF evaluation values (see FIG. 4B) indicating the heights of the contrast of the image in the each of the AF evaluation areas P on the basis of the image data of the each of the AF evaluation areas P set by the area setting section 7c with regard to the analysis result image data L generated by the image recognizing section 7a. To put it concretely, when the focus lens 1 is moved into the optical axis direction thereof by the lens driving section 2 in automatic focusing processing, the evaluation value calculating section 7d calculates the AF evaluation value of each of the plurality of AF evaluation areas P at the distance measuring positions corresponding to a predetermined number (for example, 20-30) of addresses among a plurality of (for example, 0-100) focus lens addresses defining the positions of the focus lens 1 in the optical axis direction.

Incidentally, FIG. 4B shows the AF evaluation value of each of the AF evaluation areas P1-P9 calculated by the evaluation value calculating section 7d by relating the AF evaluation value to each of the focus lens addresses in the case of setting, for example, nine AF evaluation areas P.

The evaluation value calculating section 7d thus calculates AF evaluation values (focusing evaluation values) with regard to one or a plurality of AF evaluation areas P set by the area setting section 7c.

Moreover, the AF processing section 7 includes a range specifying section 7e to specify a range in which AF evaluation values concentrate when a plurality of AF evaluation values is aligned in accordance with the distance measuring positions of the focus lens 1.

The range specifying section 7e concretely first aligns the AF evaluation values of a plurality of AF evaluation areas P in accordance with focus lens addresses (distance measuring positions), and searches for a position where the most the peak positions of the AF evaluation values are included in an evaluation value search range set in a predetermined range. For example, in FIG. 4B, the peak positions of the AF evaluation values in the AF evaluation areas P1-P4, P6, P7, and P9 other than the AF evaluation areas P5 and P8 exist in the neighborhood of the focus lens address of 40, and the range in which the addresses of the peak positions concentrate is specified as an evaluation value concentrating range R.

Incidentally, although the AF evaluation values of each of the AF evaluation areas P are aligned by relating them to the distance measuring positions of the focus lens 1 in FIG. 4B, the AF evaluation values may be aligned in accordance with the focus distances of the focus lens 1.

The range specifying section 7e thus specifies a focus distance range (evaluation value concentrating range R) including the most the peak positions of the AF evaluation values in each of the AF evaluation areas in a predetermined range on the basis of the plurality of AF evaluation values calculated by the evaluation value calculating section 7d and the focus distances obtained from the AF evaluation values.

Moreover, the AF processing section 7 includes a distance calculating section 7f to calculate a focus distance at which the imaging section can be focused.

The distance calculating section 7f obtains distance measuring positions of the focus lens 1 corresponding to the peak positions of a plurality of AF evaluation values specified in the evaluation value concentrating range R by the range specifying section 7e, and calculates an average (average focus distance) of the focus distances obtained by converting these distance measuring positions. For example, in FIG. 4B, the distance calculating section 7f specifies an average focus distance by calculating the average of the focus distances corresponding to the peak positions of the AF evaluation values of the AF evaluation areas P1-P4, P6, P7, and P9 existing in the evaluation value concentrating range R specified by the range specifying section 7e.

The distance calculating section 7f thus calculates the average of the focus distances corresponding to the peak positions of a plurality of AF evaluation values in the evaluation value concentrating range R specified by the range specifying section 7e.

Incidentally, the distance calculating section 7f may calculate the focus lens address at which the focus lens 1 can be focused in the most the AF evaluation areas P among the plurality of AF evaluation areas P in the evaluation value concentrating range R as the focus distance in place of the average of the focus distances of the plurality of AF evaluation areas P. That is, the distance calculating section 7f may calculates the focus lens address at which the most images of the AF evaluation areas P can be contained in the depth of field thereat as the focus distance in the evaluation value concentrating range R.

Moreover, the distance calculating section 7f may also calculate the intermediate position of the evaluation value concentrating range R as the focus distance.

The image processing section 8 includes a coding section (not shown) to compress and code the image data (YUV data) generated by the image generating section 6 by a predetermined coding system (for example, Joint Photographic Experts Group (JPEG) system), and a decoding section (also not shown) to decode the coded image data read out of the image recording section 10 by a decoding system corresponding to the coding system thereof.

The display section 9 converts the YUV data for one frame stored in the buffer memory 12 into a video signal before displaying the converted video signal as a live view image on the display screen thereof. To put it concretely, the display section 9 sequentially displays live view images on the basis of a plurality of image frames generated based on the images of a subject, or displays rec view images imaged as the present imaged images.

Moreover, the display section 9 displays an image based on the image data read out of the image recording section 10 to be decoded by the image processing section 8 at the time of image reproducing.

Figure 5C:
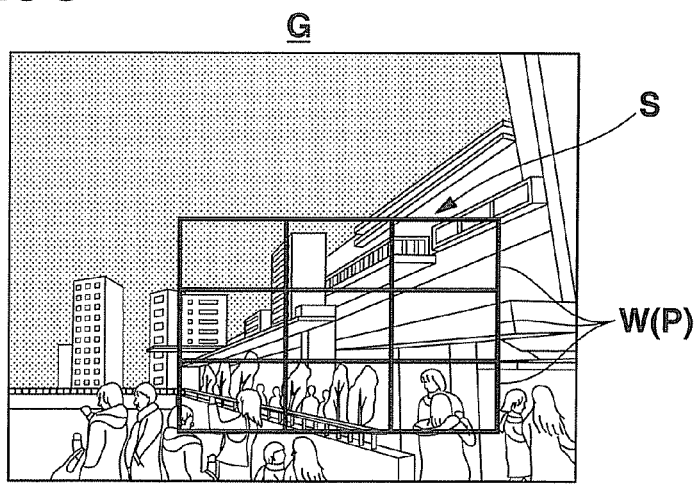
FIG. 5C is an example of a diagram showing an image displayed in a state where the AF frames are superimposed on the image in FIG. 5A.
Figure 6A:
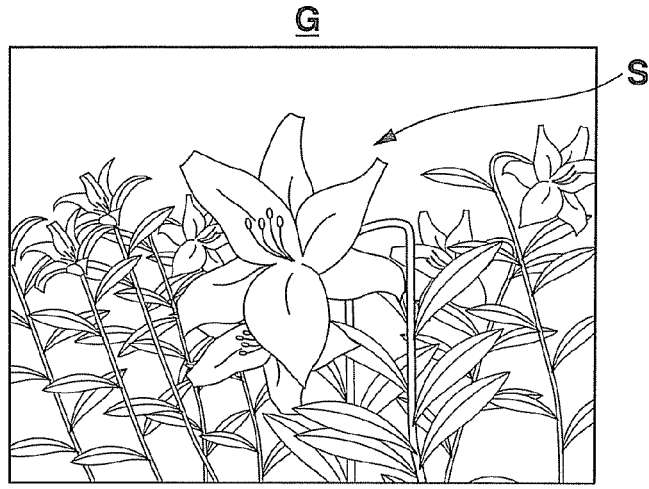
FIG. 6A is an example of a diagram of an image relating to the imaging processing in FIG. 2.
Figure 6B:
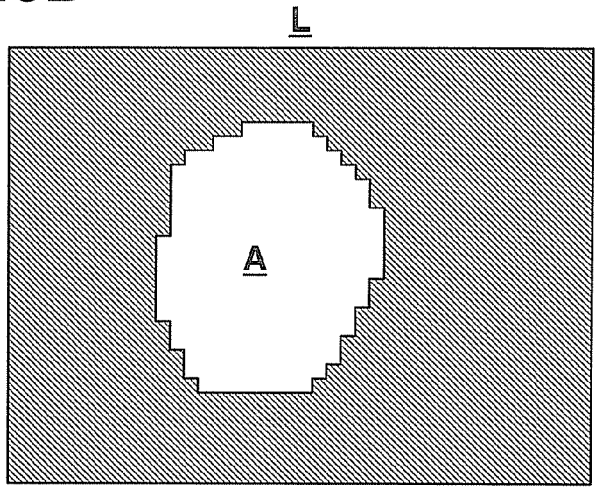
FIG. 6B is an example of a diagram of a result of the analysis of the image in FIG. 6A.
Figure 6C:
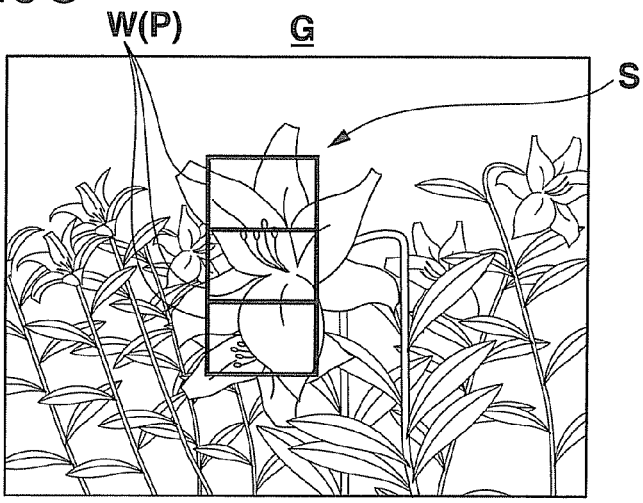
FIG. 6C is an example of a diagram showing an image displayed in a state where the AF frames are superimposed on the image in FIG. 6A.
Figure 7A:
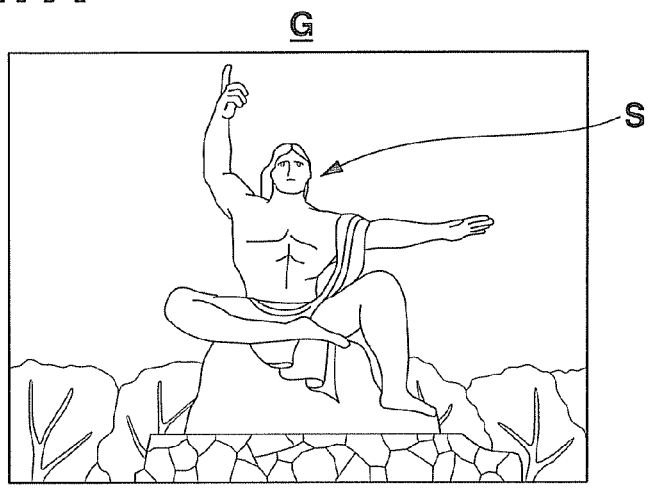
FIG. 7A is an example of a diagram of an image relating to the imaging processing in FIG. 2.
Figure 7B:
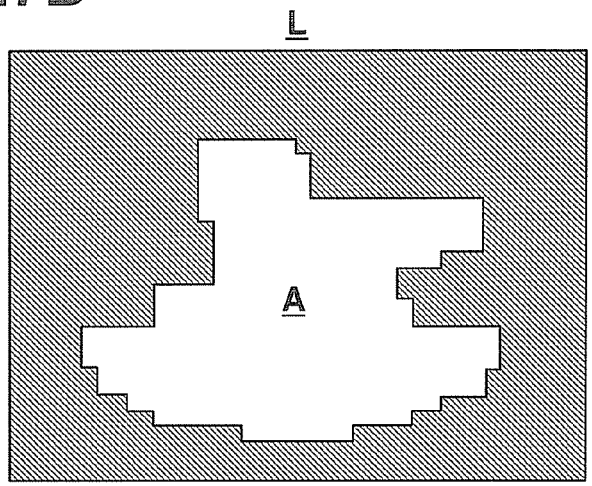
FIG. 7B is an example of a diagram of a result of the analysis of the image in FIG. 7A.
Figure 7C:
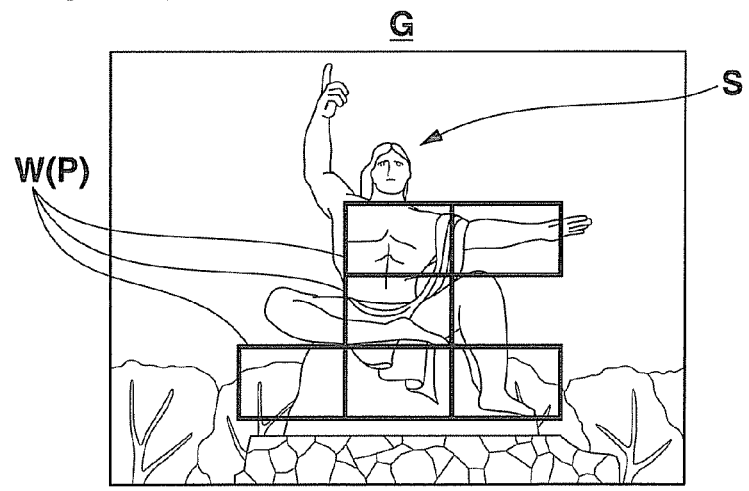
FIG. 7C is an example of a diagram showing an image displayed in a state where the AF frames are superimposed on the image in FIG. 7A.

Moreover, when the shutter button 11a of the operation inputting section 11 is pushed halfway during the display of a live view image, the display section 9 displays AF frame displays (focused area frames) W by relating the AF frame displays W to the AF evaluation areas P existing at the focus distances to be focused (see FIGS. 5C, 6C, and 7C).

The image recording section 10 is composed of, for example, a nonvolatile memory (flash memory). Moreover, the image recording section 10 recodes still image data and moving image data both compressed and coded by predetermined coding systems (such as the JPEG system and an Moving Picture Coding Expert Group (MPEG) system) by the coding section (not shown) of the image processing section 8.

The operation inputting section 11 is for performing predetermined operations of the imaging apparatus 100. To put it concretely, the operation inputting section 11 includes the shutter button 11a capable of being operated halfway and fully with regard to an imaging instruction of a subject, a selection determining button (not shown) pertaining to selection instructions of an imaging mode, a function, and the like, a zoom button (not shown) pertaining to a zoom amount adjusting instruction, and the like, and the operation inputting section outputs predetermined operations signals to the CPU 14 according to the operations of these buttons.

The buffer memory 12 is a buffer to temporarily save image data and the like, and is used as a working memory of the CPU 14 and the like.

The program memory 13 stores various programs and data pertaining to the functions of the imaging apparatus 100. Moreover, the program memory 13 also stores program automatic exposure (AE) data, which constitute a program diagram showing combinations of iris diaphragm values (F) and shutter speeds corresponding to appropriate exposure values (EV) at each imaging time, such as a still image imaging time, a continuous shooting time, a live view image imaging time, and the like, and an exposure value (EV) table.

The CPU 14 is a one-chip microcomputer to control each section of the imaging apparatus 100.

Moreover, the CPU 14 controls each section of the imaging apparatus 100 on the basis of operation signals output from the operation inputting section 11 to be input into the CPU 14. To put it concretely, when an image signal, which has been output in accordance with a predetermined operation of the shutter button 11a in the operation inputting section 11, is input into the CPU 14, the CPU 14 controls the driving timings of the electronic imaging section 3 and the unit circuit 4 with the TG in accordance with a predetermined program stored in the program memory 13 to execute the processing of imaging a still image. The YUV data for one frame stored in the buffer memory 12 by the imaging of the still image is compressed and decoded by the JPEG system or the like by the image processing section 8 to be recorded in the image recording section 10 as still image data.

Moreover, the CPU 14 outputs a predetermined control signal to the lens driving section 2 to drive the focus motor to adjust the focusing position of the focus lens 1 so that the focus distance of the focus lens 1 may be the focus distance in the evaluation value concentrating range R specified by the range specifying section 7e in automatic focusing processing. To put it concretely, the CPU 14 outputs a predetermined control signal to the les driving section 2 to drive the focus motor on the basis of the average focus distance calculated by the distance calculating section 7f from a plurality of focus distances in the evaluation value concentrating range R, and the CPU 14 thereby adjusts the focus distance of the focus lens 1 to be the average focus distance.

The CPU 14 and the lens driving section 2 thus focus the focus lens 1 on the basis of the calculation result of the evaluation value calculating section 7d.

The image processing pertaining to a focusing method by the imaging apparatus 100 will next be described with reference to FIGS. 2-7C.

Figure 2:
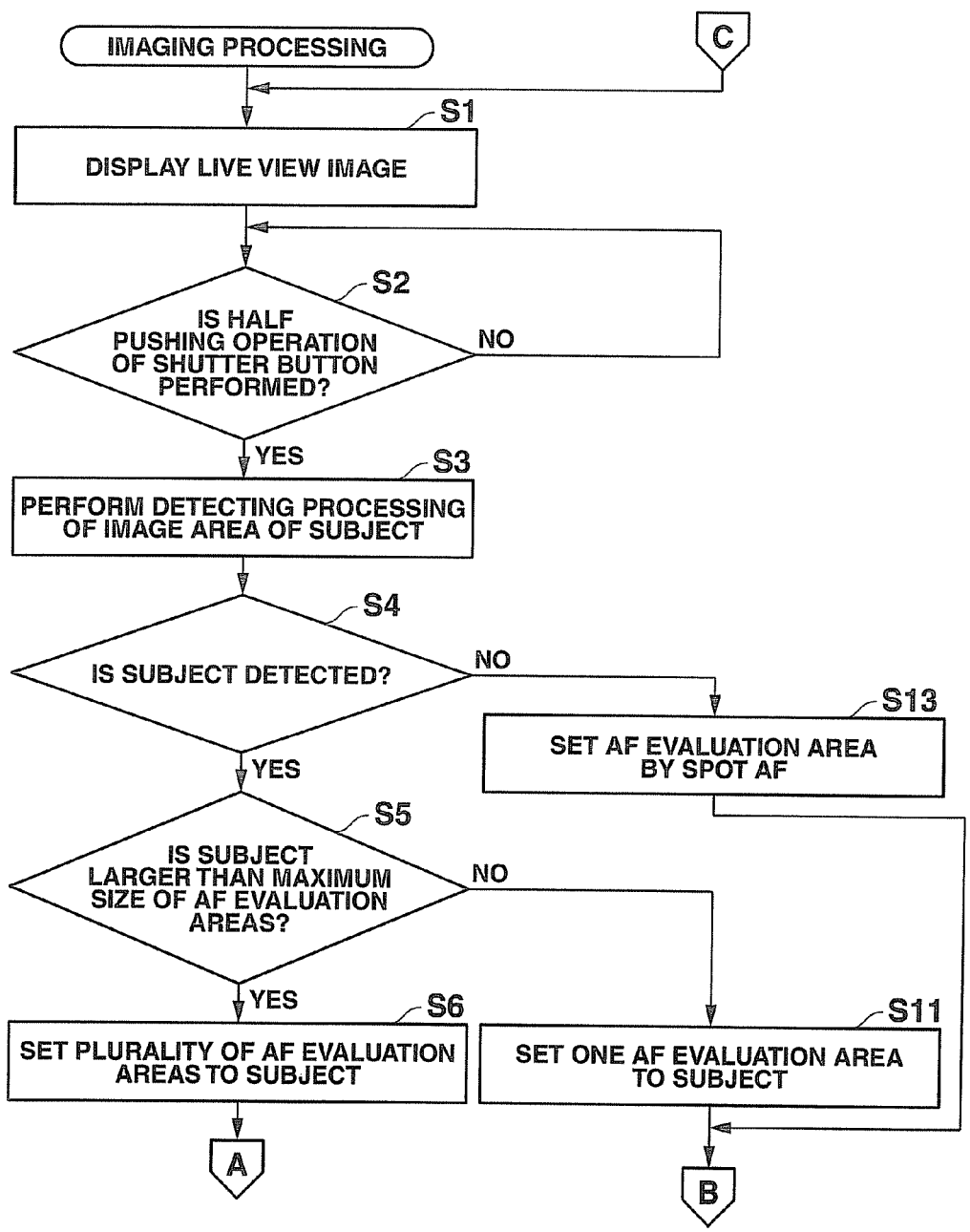
FIG. 2 is a flow chart showing an example of the operation pertaining to the imaging processing by the imaging apparatus.
Figure 3:
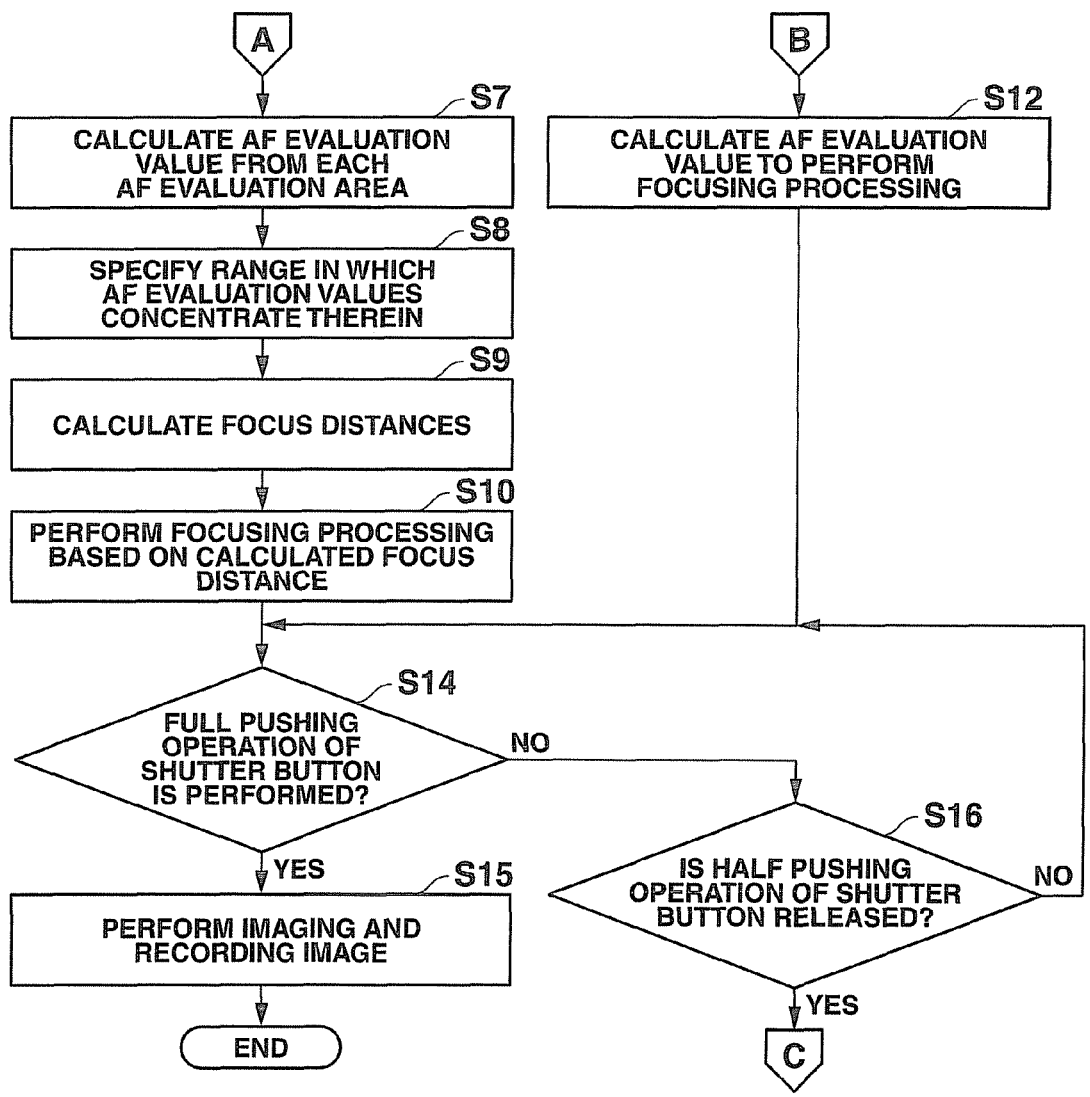
FIG. 3 is a flow chart showing an example of the operation to be performed next to the imaging processing in FIG. 2.

FIGS. 2 and 3 are flow charts showing an example of the operation pertaining to the imaging processing.

The imaging processing is the processing of imaging a still image or a moving image under the control of the CPU 14, and is executed when an imaging mode is selected and instructed among a plurality of imaging modes displayed on a menu screen on the basis of a predetermined operation with the selection determining button of the operation inputting section 11 by a user.

As shown in FIG. 2, the CPU 14 first makes the display screen of the display section 9 display a live view image on the basis of a plurality of image frames generated based on the image of a subject (Step S1).

The CPU 14 successively judges whether a user performs a half pushing operation of the shutter button 11a of the operation inputting section 11 or not (Step S2).

If it is judged here that the shutter button 11a is performed the half pushing operation (Step S2; YES), then the image recognizing section 7a of the AF processing section 7 performs the processing of detecting an image area A of a subject S from image data every transmission of the image data, pertaining to a plurality of image frames (see FIG. 5 and the like) of the imaged image G generated by an image of the subject, from the image generating section 6 to the AF processing section 7 (Step S3). To put it concretely, the image recognizing section 7a of the AF processing section 7 performs predetermined magnification ratio reducing processing to each image data transmitted from the image generating section 6 to generate analysis result image data L (for example, lateral direction×longitudinal direction: 40×30 pixels). After that, the image recognizing section 7a specifies the subject S (see FIG. 5B) to be a focusing object by the use of a predetermined image recognition technique to the analysis result image data L to extract the subject S.

The AF processing section 7 next judges whether the subject S is detected or not on the basis of a detection result of the subject S by the image recognizing section 7a (Step S4). Then, if it is judged that the subject S is detected (Step S4; YES), then the area judging section 7b of the AF processing section 7 judges whether the size of the image data A of the subject S detected by the image recognizing section 7a is larger than the maximum size of each of the AF evaluation area P set in advance or not (Step S5).

If the size of the image area A of the subject S is here judged to be larger than the maximum size of the AF evaluation area P (Step S5; YES), then the area setting section 7c of the AF processing section 7 sets each of a plurality of AF evaluation areas P (for example, nine AF evaluation areas P; see FIG. 4A) at the positions where the AF evaluation areas P overlap with the image area A of the subject S and at the positions where the AF evaluation areas P intersect with the contour part of the image area A of the subject S so as to contain the image area A of the subject S, then the CPU 14 makes the display section 9 display the plurality of AF evaluation areas P to be superimposed on the subject S of the live view image (Step S6).

As shown in FIG. 3, the evaluation value calculating section 7d of the AF processing section 7 calculates AF evaluation values indicating the heights of the contrast of the image on the basis of the image data of the AF evaluation areas P set by the area setting section 7c with regard to the analysis result image data L (Step S7). To put it concretely, the evaluation value calculating section 7d calculates an AF evaluation value to each of the plurality of AF evaluation areas P at the distance measuring positions corresponding to a predetermined number (for example, 20-30) of addresses among a plurality (for example, 0-100) of focus lens addresses defining the positions of the focus lens 1 in the optical axis direction thereof.

The range specifying section 7e next aligns the AF evaluation values of the plurality of AF evaluation areas P in accordance with the focus lens addresses (distance measuring positions), and searches for the range in which the most peak positions of the AF evaluation values are contained to specify the range (Step S8). For example, in FIG. 4B, the range specifying section 7e specifies a range in the neighborhood of a focus lanes address 40, in which the peak positions of the AF evaluation values of the AF evaluation areas P1-P4, P6, P7, and P9 exist, as the evaluation value concentrating range R. After that, the CPU 14 makes the display section 9 display the AF frame displays W (see FIG. 5C and the like) corresponding to the edge part of the AF evaluation areas P in the evaluation value concentrating range R to be superimposed on the subject S of the live view image.

The distance calculating section 7f successively obtains the distance measuring positions of the focus lens 1 corresponding to the peak positions of the plurality of AF evaluation values in the evaluation value concentrating range R specified by the range specifying section 7e, and calculates the average (average focus distance) of the focus distances converted from the distance measuring positions (Step S9). For example, in FIG. 4B, the distance calculating section 7f calculates the average of the focus distances corresponding to the peak positions of the AF evaluation values of the AF evaluation areas P1-P4, P6, P7, and P9.

The CPU 14 next outputs a predetermined control signal to the lens driving section 2 on the basis of the average focus distance calculated by the distance calculating section 7f to drive the focus motor, and thereby performs focusing processing to adjust the focus distance of the focus lens 1 to the average focus distance (Step S10).

As shown in FIG. 2, on the other hand, if it is judged that the size of the image area A of the subject S is equal to or less than the maximum size of the AF evaluation areas P at Step S5 (Step S5; NO), then the area setting section 7c sets one AF evaluation area P so that the central coordinates of the AF evaluation area P may overlap with the central coordinates of the image area A (Step S11). After that, the CPU 14 makes the display section 9 display the AF frame displays W corresponding to the edge part of the AF evaluation areas P to be superimposed on the subject S of the live view image.

As shown in FIG. 3, the evaluation value calculating section 7d performs the processing of calculating the AF evaluation value indicating the height of the contrast of the image on the basis of the image data of the AF evaluation area P set by the area setting section 7c with regard to the analysis result image data L (for example, lateral direction×longitudinal direction: 40×30 pixels). After that, the CPU 14 outputs a predetermined control signal to the lens driving section 2 to drive the focus motor on the basis of the distance measuring position of the focus lens 1 corresponding to the peak position of the AF evaluation value calculated by the evaluation value calculating section 7d, and thereby performs the focusing processing of adjusting the focusing position of the focus lens 1 (Step S12).

As shown in FIG. 2, if it is moreover judged that the subject S is not detected at Step S4 (Step S4; NO), the area setting section 7c switches the distance measuring method to the "spot AF" to set an AF evaluation area P around at the center of the field angle (Step S13). After that, the CPU 14 shifts the processing to that at Step S12, and performs the processing on and after Step S12.

As shown in FIG. 3, after the focusing processing at Step S10 or S12, the CPU 14 judges whether the shutter button 11a of the operation inputting section 11 is fully pushed by a user or not (Step S14).

If it is judged here that the shutter button 11a is performed to the full pushing operation (Step S14; YES), then the CPU 14 makes the imaging controlling section 5 adjust the conditions such as exposure conditions (shutter speed, iris diaphragm, amplification factor, and the like) and white balance to make the electronic imaging section 3 image the optical image of the subject (see FIG. 5C and the like) under predetermined conditions. After that, the CPU 14 makes the coding section (not shown) of the image processing section 8 compress and code the YUV data of the still image (or moving image) generated through the unit circuit 4 and the image generating section 6 by a predetermined coding system (such as the JPEG system or the MPEG system) before making the image recording section 10 record the compressed and coded data (Step S15).

On the other hand, if it is judged that the shutter button 11a is not performed to any full pushing operations at Step S14 (Step S14; NO), then the CPU 14 judges whether the half pushing operation of the shutter button 11a is released or not (Step S16).

If it is judged here that the half pushing operation of the shutter button 11a is not released (Step S16; NO), then the CPU 14 shifts the processing to that at Step S14, and repeatedly performs the processing on and after Step S14 until the shutter button 11a is performed to a fully pushing operation. On the other hand, if it is judged that the half pushing operation of the shutter button 11a is released (Step S16; YES), then the CPU 14 shifts the processing to that at Step S1 to start the processing from the beginning of the imaging processing.

As described above, according to the imaging apparatus 100 of the first embodiment, a plurality of AF evaluation areas P is set on the basis of the image area A of the subject S, and the AF evaluation value of each of the AF evaluation areas P is severally calculated on the basis of the image data of the set plurality of AF evaluation areas P. It is consequently possible to set the AF evaluation areas P to the image area A of the subject S to any composition. Moreover, when the plurality of AF evaluation values are aligned in accordance with the focus distances of the focus lens 1, the evaluation value concentrating range R in which the AF evaluation values concentrate is specified, and the focus lens 1 is focused at a focus distance in the evaluation value concentrating range R. A plurality of AF evaluation areas P can consequently be set according to a subject S even if the subject S is the one having low contrast, such as a night view (see FIG. 5A) or a large subject (see FIG. 6A or 7A). It is accordingly possible to set the AF evaluation areas P having the peak positions of the AF evaluation values in the evaluation value concentrating range R to be effective among the AF evaluation areas P, and to focus the focus lens 1 at a focus distance in the evaluation value concentrating range R.

It is consequently possible to focus the focus lens 1 on the subject independent of composition, and thereby the operation of focusing the focus lens 1 on a part having high contrast in advance before panning the camera for containing a part having low contrast in a field angle again becomes unnecessary. The focus adjustment of the imaging apparatus 100 can be performed properly and simply.

Moreover, because the average of the focus distances corresponding to the peak positions of the plurality of AF evaluation values in the evaluation value concentrating range R is calculated to focus the focus lens 1 at the average focus distance, the number of the AF evaluation areas P in which the subject S is substantially in focus phenomenally can be increased among the plurality of AF evaluation areas P set according to the subject S.

That is, for example, as shown in FIG. 4B, if the focus lens 1 is focused at an average focus distance with regard to seven AF evaluation areas P containing the peak positions of the AF evaluation values in the evaluation value concentrating range R among the nine AF evaluation areas P, then it is possible to make the images in more AF evaluation areas P be substantially in focus phenomenally, although the focus lens 1 is not completely in focus on some images to be blurred at some positions strictly speaking. The focus adjustment even to a subject S having low contrast can consequently be performed easily.

Furthermore, if the shutter button 11a of the operation inputting section 11 is performed to a half pushing operation during a display of a live view image, then the AF frame displays W are displayed by being related to the AF evaluation areas P existing in the focus distance at which the focus lens 1 becomes in-focus, and a plurality of AF frame displays W corresponding to the effective AF evaluation areas P having their peak positions of their AF evaluation values in the evaluation value concentrating range R can consequently be displayed. It is thereby possible to inform a user of the positions in the state of being substantially in focus phenomenally. Even if a subject S having low contrast is imaged, it is consequently possible to enable a user to perceive the places at which the subject S is substantially in focus.

Moreover, it is possible to change the number of settings of the AF evaluation areas P according to the size of an image area A of a subject S to set the AF evaluation areas P. To put it concretely, if the size of an image area A of a subject S is larger than the maximum size of the AF evaluation areas P, then a plurality of AF evaluation areas P is set. On the other hand, if the size of an image area A of a subject S is equal to or less than the maximum size of the AF evaluation area P, one AF evaluation area P can be set. That is, it is possible to cope with any subject S having any size by changing the number of the AF evaluation areas P to be set according to the size of an image area A of the subject S, and to perform the focus adjustment of the focus lens 1 more properly.

Moreover, if a plurality of AF evaluation areas P is set, then each of the plurality of AF evaluation areas P is set so as to contain an image area A of a subject S, that is, so as to set the plurality of AF evaluation areas P at the positions where the AF evaluation areas P overlap with the image area A of the subject S and the positions where the AF evaluation areas P intersect with the contour part of the image area A of the subject S. Moreover, even if a contrast of the subject S is low, a contrast difference exists at least on a border of the subject S with the other parts. The evaluation value calculating section 7d can calculates more appropriate AF evaluation values, and the focus adjustments of the focus lens 1 can be performed more properly.

Incidentally, although the evaluation value concentrating range R, which is previously set to be in a predetermined range, has been exemplified as the range in which the AF evaluation values calculated by the evaluation value calculating section 7d concentrate in the first embodiment described above, the range is not limited to the evaluation value concentrating range R. For example, a range including a predetermined ratio (for example, 50-70%) of AF evaluation values among the AF evaluation values of a plurality of AF evaluation areas P may be set as the range in which the AF evaluation values concentrate.

Second Embodiment

Figure 8:
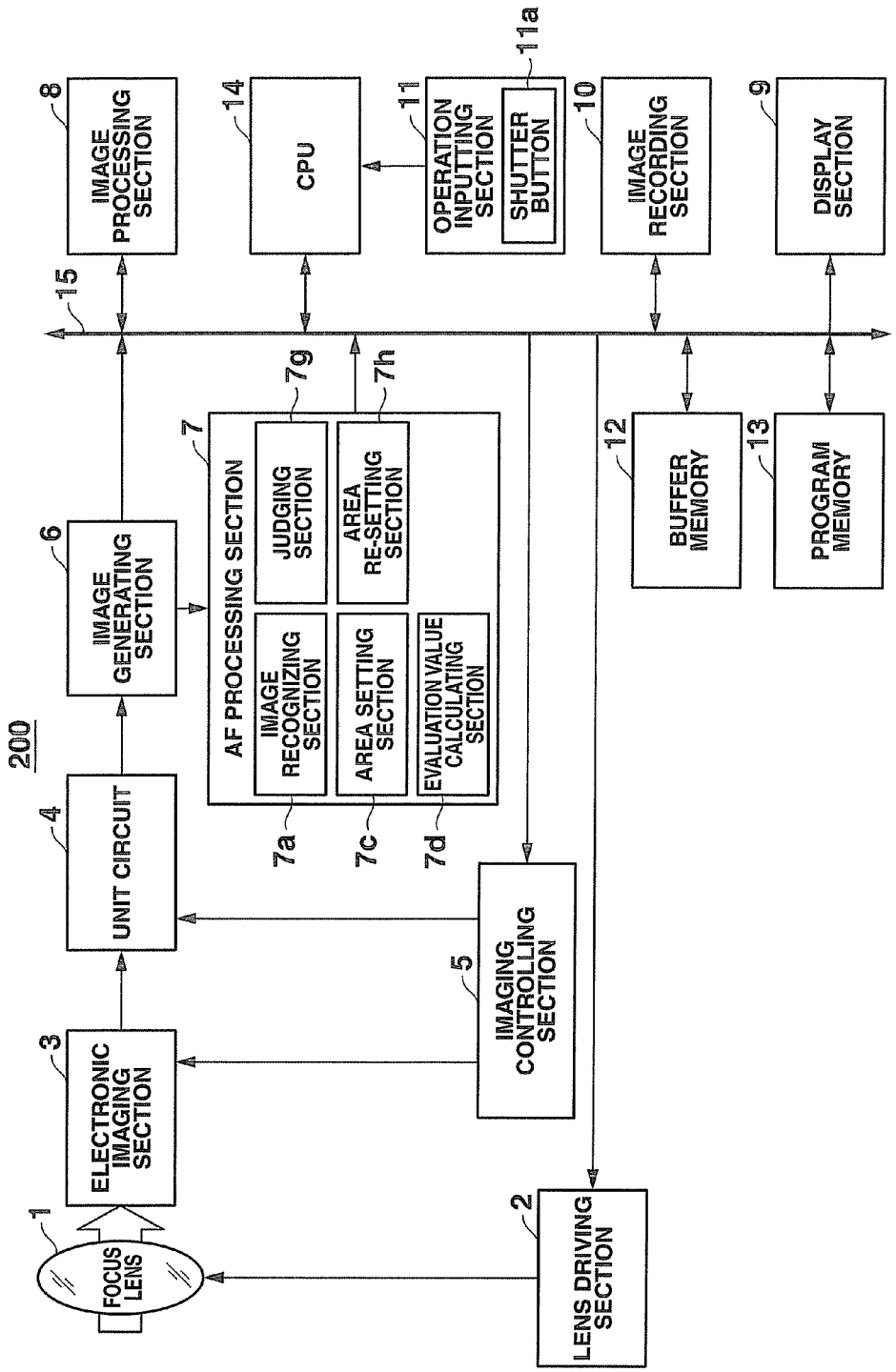
FIG. 8 is a block diagram showing the schematic configuration of an imaging apparatus of a second embodiment to which the present invention is applied.

FIG. 8 is a block diagram showing the schematic configuration of an imaging apparatus 200 of a second embodiment, to which the present invention is applied. Incidentally, the components of the configuration of the imaging apparatus 200 of the second embodiment are the same as those of the imaging apparatus 100 of the first embodiment except the ones to be described in the following, and the detailed descriptions of the same ones will be omitted.

The imaging apparatus 200 of the second embodiment calculates the AF evaluation value of an AF evaluation area on the basis of the image data including the AF evaluation area pertaining to the evaluation of a focused state, and judges whether to perform the re-setting of the AF evaluation area on the basis of the calculated AF evaluation value or not. If it is judged that the re-setting of the AF evaluation area is performed, an AF evaluation area is re-set at a position different from the already set one on the basis of the result of the image recognition based on the already set AF evaluation area.

The AF processing section 7 includes a re-set judging section 7g and an area re-setting section 7h besides the image recognizing section 7a, the area setting section 7c, and the evaluation value calculating section 7d.

When a subject S is detected by image recognition processing by the image recognizing section 7a, the area setting section 7c sets an AF evaluation area P21 (see FIG. 10A) at an image area A of the detected subject S, more concretely, at the position of center of gravity of the subject S. On the other hand, if no subjects S is detected, then the area setting section 7c changes the distance measuring method at that time to a "spot AF" method to set an AF evaluation area at almost the center of the field angle in that case.

The re-set judging section 7g judges whether an AF evaluation area P22 is re-set or not on the basis of an AF evaluation value calculated by the evaluation value calculating section 7d.

That is, the re-set judging section 7g judges whether the AF evaluation value of the AF evaluation area P21 calculated by the evaluation value calculating section 7d is equal to or more than a predetermined value or not. If it is judged that the AF evaluation value of the AF evaluation area P21 is smaller than the predetermined value as a result of the judgment, then the re-set judging section 7g judges to perform the re-setting of the AF evaluation area P22 with the area re-setting section 7h on the basis of a result of the image recognition processing by the image recognizing section 7a.

Incidentally, if the AF evaluation value of the AF evaluation area P21 is judged to be smaller than the predetermined value in the case where the image recognizing section 7a does not perform the detection of the subject S and the AF evaluation area P21 is set, that is, for example, in the case where the setting of the AF evaluation area P21 is performed on the basis of a predetermined operation of the operation inputting section 11 by a user, then the re-set judging section 7g may judge to perform image recognition with the image recognizing section 7a on the basis of the AF evaluation area P21.

The re-set judging section 7g thus judges whether to re-set the AF evaluation area P22 or not on the basis of the AF evaluation value calculated by the evaluation value calculating section 7d.

The area re-setting section 7h re-sets the AF evaluation area P22 at which the focus lens 1 should be in-focus in the imaged image G.

That is, if it is judged to perform the re-setting of the AF evaluation area P22 by the re-set judging section 7g, then the area re-setting section 7h re-sets the AF evaluation area P22 in which the focus lens 1 should be in-focus in the imaged image G at a position different from that of the AF evaluation area P21 already set by the area setting section 7c. To put it concretely, the area re-setting section 7h re-sets at least one AF evaluation area P22 (see FIGS. 10C and 10D) in an area containing an image area A of a subject S in the imaged image G or at a position where the AF evaluation area P22 intersects with a contour part of the image area A of the subject S on the basis of the result of image recognition processing based on the AF evaluation area P21 by the image recognizing section 7a.

If it is judged to perform the re-setting of the AF evaluation area P22 by the re-set judging section 7g, the area re-setting section 7h thus re-sets an area different from the area that has already set to include the image area A detected by the image recognizing section 7a as the AF evaluation area P22, in which the AF evaluation value should be calculated.

Incidentally, if it is judged to perform the re-setting of the AF evaluation area P22 by the re-set judging section 7g in the case where the image recognizing section 7a does not perform the detection of the subject S and the AF evaluation area P21 is set, that is, for example, in the case where the setting of the AF evaluation area P21 is performed on the basis of a predetermined operation of the operation inputting section 11 by a user, then the image recognizing section 7a first performs image recognition processing on the basis of the AF evaluation area P21 based on the image data of the imaged image G. After that, the area setting section 7c re-sets the AF evaluation area P22 on the basis of the result of the image recognition processing by the image recognizing section 7a.

That is, if it is judged to perform the re-setting of the AF evaluation area P22 by the re-set judging section 7g, then the area re-setting section 7h re-sets the AF evaluation area P22, in which the focus lens 1 should be in-focus in the imaged image G, at a position different from that of the AF evaluation area P21, which has already been set by the area setting section 7c, on the basis of the result of the image recognition processing based on the AF evaluation area P21 by the image recognizing section 7a.

Incidentally, the number of the AF evaluation areas P22 to be re-set can suitably arbitrarily be changed according to, for example, the size of the already set AF evaluation area P21 and the size of the image area A of the subject S. For example, the maximum size of the AF evaluation areas may previously be set. If the size of an image area A of a subject S is larger than the maximum size, a plurality of AF evaluation areas P22 may be set. On the other hand, if the size of an image area A of a subject S is equal to or less than the maximum size of the AF evaluation areas P22, one AF evaluation area P22 of the maximum size may be set. The re-setting of the AF evaluation areas P22 can thereby be performed properly to any size of the image area A of the subject S.

The evaluation value calculating section 7d calculates an AF evaluation value on the basis of the image data of the AF evaluation areas P22 re-set by the area re-setting section 7h.

The CPU 14 outputs a predetermined control signal to the lens driving section 2 to drive the focus motor on the basis of the AF evaluation value calculated by the evaluation value calculating section 7d based on the image data in the AF evaluation areas P22 re-set by the area re-setting section 7h of the AF processing section 7, and the CPU 14 adjusts the focused position of the focus lens 1.

Moreover, the CPU 14 makes the display section 9 display the AF frame displays F21 and F22 corresponding to the edge parts of the AF evaluation areas P21 and P22 set by the area setting section 7c or the area re-setting section 7h of the AF processing section 7 to be superimposed on a live view image.

The image processing pertaining to a focusing method by the imaging apparatus 200 will next be described with reference to FIGS. 9, and 10A-10D.

FIG. 9 is a flow chart showing an example of the operation pertaining to the imaging processing.

As shown in FIG. 9, the CPU 14 first makes the display screen of the display section 9 display a live view image on the basis of a plurality of image frames generated based on the image of a subject (Step S21).

The CPU 14 successively judges whether a user performs a half pushing operation of the shutter button 11a of the operation inputting section 11 or not (Step S22). If it is judged here that the shutter button 11a is performed to the half pushing operation (Step S22; YES), then the image recognizing section 7a of the AF processing section 7 performs the processing of detecting an image area A of a subject S from image data every transmission of the image data, pertaining to a plurality of image frames (see FIG. 10A and the like) of the imaged image G generated by an image of the subject, from the image generating section 6 to the AF processing section 7 (Step S23). To put it concretely, the image recognizing section 7a of the AF processing section 7 performs predetermined magnification ratio reducing processing to each image data transmitted from the image generating section 6 to obtain image data of low resolution, following which the image recognizing section 7a generates analysis result image data L (for example, lateral direction×longitudinal direction: 40×30 pixels). After that, the image recognizing section 7a specifies the image area A of the subject S (see FIG. 10B) to be a focusing object by the use of a predetermined image recognition technique to the analysis result image data L to extract the image area A.

The AF processing section 7 next judges whether the subject S is detected or not on the basis of a detection result of the image area A by the image recognizing section 7a (Step S24). Then, if it is judged that the subject S is detected (Step S24; YES), then the area judging section 7b of the AF processing section 7 sets the AF evaluation area P21 at the gravity center position of the detected subject S (Step S25). After that, the CPU 14 makes the display section 9 display the AF frame display F21 corresponding to the edge part of the AF evaluation area P21 to be superimposed on the subject S of the live view image.

The evaluation value calculating section 7d of the AF processing section 7 successively performs the processing of calculating the AF evaluation values indicating the heights of contrast of an image on the basis of the image data of the AF evaluation area P21 (Step S26). Then, the re-set judging section 7g of the AF processing section 7 judges whether the AF evaluation value equal to or more than a predetermined value is calculated in the AF evaluation area P21 or not on the basis of the calculated result of the AF evaluation value by the evaluation value calculating section 7d (Step S27).

If the AF evaluation value equal to or more than the predetermined value is judged to be calculated here (Step S27; YES), then the CPU 14 outputs a predetermined control signal to the lens driving section 2 to drive the focus motor on the basis of the AF evaluation value calculated by the evaluation value calculating section 7d, and the CPU 14 performs the focusing processing of adjusting the focused position of the focus lens 1 (Step S28).

Figure 10C:
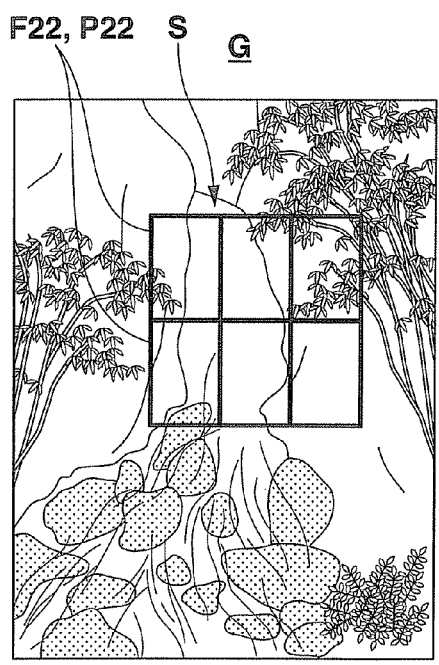
FIG. 10C is an example of a diagram showing the AF evaluation areas reset in the imaging processing in FIG. 8.
Figure 10D:
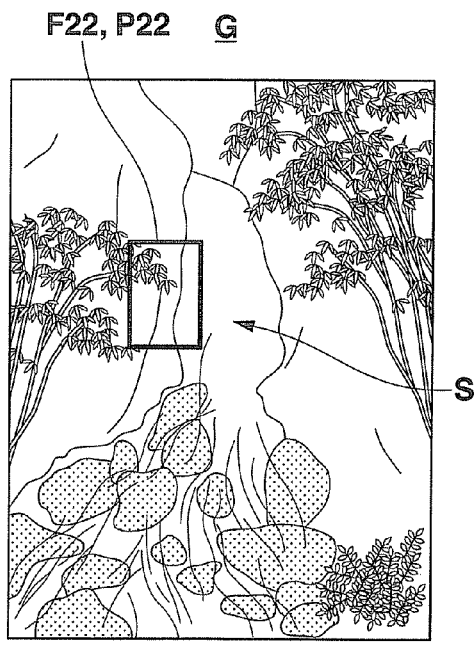
FIG. 10D is an example of a diagram showing the AF evaluation areas reset in the imaging processing in FIG. 8.

On the other hand, if it is judged that any AF evaluation values equal to or more than the predetermined value are judged not to be calculated in the AF evaluation area P21 at Step S27 (Step S27; NO), then the area re-setting section 7h of the AF processing section 7 furthermore re-sets at least one AF evaluation area P22 so that the AF evaluation area P22 may intersect with an area containing the image area A in the imaged image G or the contour part of the image area A (Step S29; see FIGS. 10C and 10D). To put it concretely, the area re-setting section 7h, for example, as shown in FIG. 10C, re-sets a plurality of (for example, six) AF evaluation areas P22 in an area containing the image area A in the imaged image G or, as shown in FIG. 10D, re-sets one AF evaluation area P22 so as to intersect with the contour part of the image area A. After that, the CPU 14 makes the display section 9 display the AF frame display F22 corresponding to the edge part of the AF evaluation area P22 to be superimposed on the subject S in the live view image (see FIGS. 10C and 10D).

The evaluation value calculating section 7d next performs the processing of calculating the AF evaluation values indicating the heights of the contrast of an image on the basis of the image data of the re-set AF evaluation area P22. After that, the CPU 14 outputs a predetermined control signal to the lens driving section 2 to drive the focus motor on the basis of the AF evaluation value calculate by the evaluation value calculating section 7d, and the CPU 14 performs the focusing processing to adjust the focused position of the focus lens 1 (Step S30).

Moreover, if it is judged that no subjects S are detected at Step S24 (Step S24; NO), the area setting section 7c changes the distance measuring method at that time to "spot AF" to set an AF evaluation area around the center of the field angle (Step S31). After that, the CPU 14 shifts the processing to that at Step S30, and performs the processing on and after that.

Then, after the focusing processing at Step S28 or S30, the CPU 14 judges whether the shutter button 11a of the operation inputting section 11 is performed to a full pushing operation by a user or not (Step S32).

If it is judged here that the shutter button 11a is performed to the full pushing operation (Step S32; YES), then the CPU 14 makes the imaging controlling section 5 adjust the conditions such as exposure conditions (shutter speed, iris diaphragm, amplification factor and the like) and white balance to make the electronic imaging section 3 image an optical image of the subject S (see FIGS. 10C and 10D) under predetermined conditions. After that, the CPU 14 makes the coding section (not shown) of the image processing section 8 compress and code the YUV data of the still image (or moving image) generated through the unit circuit 4 and the image generating section 6 by a predetermined coding system (such as the JPEG system or the MPEG system) before making the image recording section 10 record the compressed and coded data (Step S33).

On the other hand, if it is judged that the shutter button 11a is not performed to any full pushing operations at Step S32 (Step S32; NO), then the CPU 14 judges whether the half pushing operation of the shutter button 11a is released or not (Step S34).

If it is judged here that the half pushing operation of the shutter button 11a is not released (Step S34; NO), then the CPU 14 shifts the processing to that at Step S32, and repeatedly performs the processing on and after that until the shutter button 11a is performed to a full pushing operation. On the other hand, if it is judged that the half pushing operation of the shutter button 11a is released (Step S34; YES), then the CPU 14 shifts the processing to that at Step S21 to start the processing from the beginning of the imaging processing.

As described above, according to the imaging apparatus 200 of the second embodiment, it is possible to prevent the setting of an AF evaluation area that is not intended by a user, and to set an AF evaluation area in a subject S.

That is, even if the AF evaluation area P21 is set in an image area A (for example, the position of the center of gravity of the subject S) of the subject S detected by the image recognizing section 7a, an AF evaluation area P22 can be re-set at a position different from the AF evaluation area P21, which has been set already, on the basis of the image recognition result based on the AV evaluation area P21. That is, the re-setting of the AF evaluation area P22 can be performed on the basis of the AF evaluation areas P21, which has been set in the image area A of the subject S.

Then, the AF evaluation value of the re-set AF evaluation area P22 can be calculated as a more appropriate value, and the adjustment of the focused position of the focus lens 1 can be performed properly.

Moreover, the area re-setting section 7h sets the AF evaluation area P22 so that the AF evaluation area P22 intersects with an area containing an image area A of a subject S in an imaged image G and the contour part of the image area A of the subject S on the basis of the result of image recognition processing based on the AF evaluation area P21 by the image recognizing section 7a. Even if a subject S itself has low contrast, a contrast difference exists at least on a border of the subject S with the other parts. The evaluation value calculating section 7d can thereby calculates more appropriate AF evaluation values to the subject S, and the focus adjustments of the focus lens 1 can be performed more properly.

Furthermore, because the area re-setting section 7h re-sets at least one AF evaluation area P22, the re-setting of the AF evaluation area P22 can be performed properly to any image area A of a subject S having any size. That is, it is possible to cope with any subject S having any size by changing the number of AF evaluation areas P22 re-set according to the size of the image area A of the subject S, and consequently the focus adjustment of the focus lens 1 can properly be performed.

Incidentally, the present invention is not limited to the first and second embodiments described above, but various improvements and changes of the design man be performed without departing from the spirit and scope of the present invention.

For example, although the AF evaluation area P21 is set in the image area A of the subject S detected by the image recognizing section 7a in the second embodiment described above, the setting of the AF evaluation area P21 by the area setting section 7c may be performed on the basis of a predetermined operation (for example, an operation of a touch panel and the like) of the operation inputting section 11 by a user.

Moreover, although the detection of a subject S in image processing is performed by taking a half pressing operation of the shutter button 11a of the operation inputting section 11 as an opportunity in the first and second embodiments described above, the detection may surely be executed during a display of a live view image independently of the existence of the operation of the shutter button 11a.

Furthermore, although analysis result image data is generated by obtaining the image data of low resolution from the image data transmitted from the image generating section 6 at the time of the specification of image data A of a subject S in the first and second embodiments described above, the image data of low resolution is not necessary to be generated, but the analysis result image data L may be generated from an imaged image G.

Moreover, although the CPU 14 and the lens driving section 2 are exemplified as a focusing controlling section in the first and second embodiments described above, the focusing controlling section is not limited to the above ones. A driving mechanism (not shown) to move the electronic imaging section 3 into the optical axis direction may be provided, and the driving mechanism may be driven under the control of the CPU 14.

Furthermore, the configurations of the imaging apparatus 100 and 200 exemplified in the first and second embodiments described above are examples, and the present invention is not limited to those configurations. The configurations can suitably arbitrarily be changed without departing from the characteristics of the present invention. For example, the imaging apparatus 200 of the second embodiment described above may include the area judging section 7b, the range specifying section 7e, and the distance calculating section 7f of the first embodiment.

In addition, although the first embodiment described above is configured to realize the functions as a detecting section, an area setting section, a calculating section, and a focusing section by the driving of the AF processing section 7 and the lens driving section 2 under the control of the CPU 14, the configuration is not limited to the driving, but the configurations may be realized by the execution of predetermined programs and the like by the CPU 14.

That is, a program including a detecting processing routine, an area setting processing routine, a calculation processing routine, and a focusing control processing routine is previously stored in the program memory 13 storing programs. Then, the CPU 14 may be functioned as a detecting section to detect an image area A of a subject S from an imaged image G imaged with the imaging section by the detecting processing routine. Moreover, the CPU 14 may be functioned as an area setting section to set one or a plurality of evaluation areas (AF evaluation areas P) to be to calculate focusing evaluation values (AF evaluation values) in an image area A of a subject S detected by the detecting processing routine by the area setting processing routine. Moreover, the CPU 14 may be functioned as the calculating section to calculate focusing evaluation values (AF evaluation values) with regard to one or a plurality of evaluation areas set by the area setting processing routine by the calculation processing routine. Moreover, the CPU 14 may be functioned as the focusing section to focus an imaging section on the basis of a calculated result by the calculation processing routine by the focusing control processing routine.

What is claimed is:

1. An imaging apparatus, comprising:
an imaging section;
a detecting section to detect an image area of a subject from an image imaged by the imaging section;
an area setting section to set one or a plurality of evaluation areas to calculate focusing evaluation values in the image area of the subject in response to detecting an image area by the detecting section;
a calculating section to calculate the focusing evaluation values with regard to the one or the plurality of evaluation areas set by the area setting section; and
a focusing section to be in focus based on a calculated result by the calculating section, wherein
a number of the one or the plurality of evaluation areas set by the area setting section is determined according to a size of the subject detected by the detecting section; and
the area setting section sets the one evaluation area when the size of the subject is equal to or less than a predetermined size, and sets the plurality of evaluation areas when the size of the subject is larger than the predetermined size.

2. The imaging apparatus according to claim 1, further comprising a second judging section to judge whether a ratio of a size of the image area of the subject detected by the detecting section to the imaged image is equal to or more than a predetermined ratio or not, wherein
the area setting section sets the plurality of evaluation areas when the second judging section judges that the ratio of the size of the image area of the subject to the imaged image is equal to or more than the predetermined ratio.

3. The imaging apparatus according to claim 2, wherein the area setting section sets each of the plurality of evaluation areas at the positions where the evaluation areas overlap with the image area of the subject or at the positions where the evaluation areas intersect with the contour part of the image area A of the subject.

4. The imaging apparatus according to claim 1, further comprising:
a specifying section to specify a focus distance range containing the most peak positions of the plurality of focusing evaluation values, calculated by the calculating section, when the area setting section sets the plurality of evaluation areas; and
a focusing controlling section to control the focusing section based on the focus distance range specified by the specifying section.

5. The imaging apparatus according to claim 4, further comprising an average distance calculating section to calculates an average of focus distances corresponding to the peak positions of the plurality of focusing evaluation values in the range specified by the specifying section, wherein
the focusing section is in focus at the average focus distance calculated by the average distance calculating section.

6. The imaging apparatus according to claim 4, further comprising an intermediate distance calculating section to calculate a distance of an intermediate point of the focus distance range specified by the specifying section, wherein
the focusing section is in focus at the distance of the intermediate point calculated by the intermediate distance calculating section.

7. The imaging apparatus according to claim 1, further comprising:
a display section to display the image imaged by the imaging section in order, the display section to display the one or the plurality of evaluation areas set by the area setting section.

8. The imaging apparatus according to claim 1, further comprising:
an operation section capable of performing a half pressing operation for instructing imaging by the imaging section; and
a display section to display the image imaged by the imaging section in order, the display section to display a focused area frame by relating the focused area to an evaluation area existing at a focus distance to be in focus by the focusing section when the operation section is performed to the half pressing operation.

9. The imaging apparatus according to claim 1, further comprising:
a third judging section to judge whether to perform re-setting of the evaluation areas or not based on the focusing evaluation values calculated by the calculating section when the area setting section sets the one evaluation areas; and
an area re-setting section to re-set an area that is different from an evaluation area has already been set by the area setting section, the re-set area set as the evaluation area in which the focusing evaluation value should be calculated when the third judging section judges performing re-setting the evaluation areas.

10. The imaging apparatus according to claim 9, wherein the area setting section sets a position of center of gravity of the image area of the subject detected by the detecting section as the evaluation area.

11. The imaging apparatus according to claim 9, wherein the area re-setting section re-sets a position intersecting with a contour part of the image area of the subject detected by the detecting section as the evaluation area.

12. The imaging apparatus according to claim 9, further comprising:
a display section to display an image; and
a display controlling section to make the display section display a frame showing the evaluation area set by the area setting section or the area re-setting section to be superimposed on the imaged image.

13. A focusing method, comprising the steps of:
detecting an image area of a subject from an image imaged by an imaging section of an imaging apparatus;
setting one or a plurality of evaluation areas to calculate focusing evaluation values in the image area of the subject in response to detecting the image area of the subject;
calculating the focusing evaluation values with regard to the one or the plurality of evaluation areas set at the step of setting; and
performing focusing based on a calculated result at the step of calculating, wherein
a number of the one or the plurality of evaluation areas is determined according to a size of the subject based on the detecting an image area; and
setting the one evaluation area when the size of the subject is equal to or less than a predetermined size, and setting the plurality of evaluation areas when the size of the subject is larger than the predetermined size.

14. A non-transitory computer-readable recording medium recording a program for enabling a computer equipped in an imaging apparatus to realize the functions as:
a detecting section to detect an image area of a subject from an imaged image;
an area setting section to set one or a plurality of evaluation areas to calculate focusing evaluation values in the image area of the subject in response to the detection section detecting the image area;
a calculating section to calculate the focusing evaluation values with regard to the one or the plurality of evaluation areas set by the area setting section; and
a focusing controlling section to be in focus based on a calculated result by the calculating section, wherein
a number of the one or the plurality of evaluation areas set by the area setting section is determined according to a size of the subject detected by the detecting section; and
the area setting section sets the one evaluation area when the size of the subject is equal to or less than a predetermined size, and sets the plurality of evaluation areas when the size of the subject is larger than the predetermined size.

15. The imaging apparatus according to claim 1, wherein the number of the one or the plurality of evaluation areas increases with an increase in the size of the subject.

* * * * *